United States Patent
Kaupp

[11] Patent Number: 5,867,971
[45] Date of Patent: Feb. 9, 1999

[54] COMBINE HEADER

[75] Inventor: William Kaupp, New Dayton, Canada

[73] Assignee: Bob Grbavac, Raymond, Canada

[21] Appl. No.: 722,870

[22] Filed: Sep. 25, 1996

[51] Int. Cl.$^6$ .......................... A01D 57/00; A01D 45/02
[52] U.S. Cl. .......................... 56/14.5; 56/119; 460/114
[58] Field of Search .................. 56/14.4, 14.5, 56/119, 220, 364; 460/16, 20, 114

[56] References Cited

U.S. PATENT DOCUMENTS

| | | | |
|---|---|---|---|
| 3,404,686 | 10/1968 | Johnson et al. | 460/114 X |
| 3,474,602 | 10/1969 | Molzahn | 56/14.4 |
| 3,719,034 | 3/1973 | Lange | 56/119 |
| 4,330,982 | 5/1982 | Vissers et al. | 56/14.5 X |
| 4,353,201 | 10/1982 | Pierce et al. | 56/364 |
| 4,550,554 | 11/1985 | Lundahl et al. | 56/364 X |
| 4,981,013 | 1/1991 | Underwood | 56/364 X |
| 5,090,187 | 2/1992 | Mews | 56/364 |
| 5,496,215 | 3/1996 | Underwood et al. | 460/114 |

FOREIGN PATENT DOCUMENTS

| | | | |
|---|---|---|---|
| 257933 | 3/1965 | Australia | 56/14.4 |
| 1223005 | 6/1960 | France | 56/14.4 |
| 2446056 | 9/1980 | France | 56/14.5 |
| 1005301 | 3/1957 | Germany | 56/14.5 |
| 2061141 | 8/1972 | Germany | 460/114 |

*Primary Examiner*—John A. Ricci
*Attorney, Agent, or Firm*—David S. Thompson

[57] ABSTRACT

An improvement for the header of a cereal grain harvesting combine is disclosed. A first version of disclosure provides rollers driving two or more chain loops which in turn carry a plurality of slats which propel cut crop material rearwardly. A second version of the disclosure includes rollers carrying an endless loop of canvass fabric. The canvass fabric is preferably covered with a rubberized coating, which protects against water damage and better frictionally engages the cut crop material. The fabric supports a plurality of slats which propel cut crop material rearwardly. A third version of the disclosure includes three rotating tubes, each having a square cross-section, that aid in more rapidly and more evenly inputting cut crop material. The tubes carry elongate felt strips which frictionally engage the cut crop, moving it rearwardly. The tubes tend to move the cut crop that would otherwise be too low to be engaged by the rotating spikes used between the left and right augers. The shape of the tubes, having a square cross-section, tends to bounce the cut crop vertically up and down, resulting in the rotating spikes carried by the reel of the header being better able to contact the crop, and thrust it backwardly, into the combine.

4 Claims, 4 Drawing Sheets

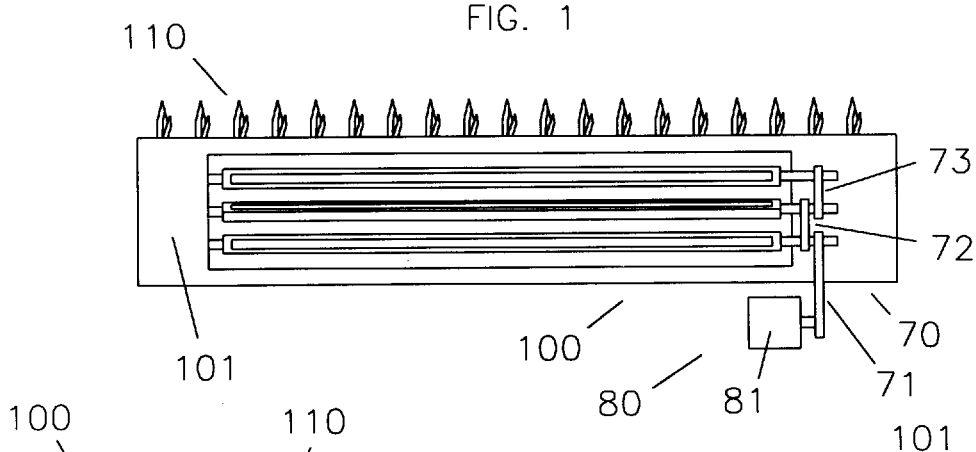
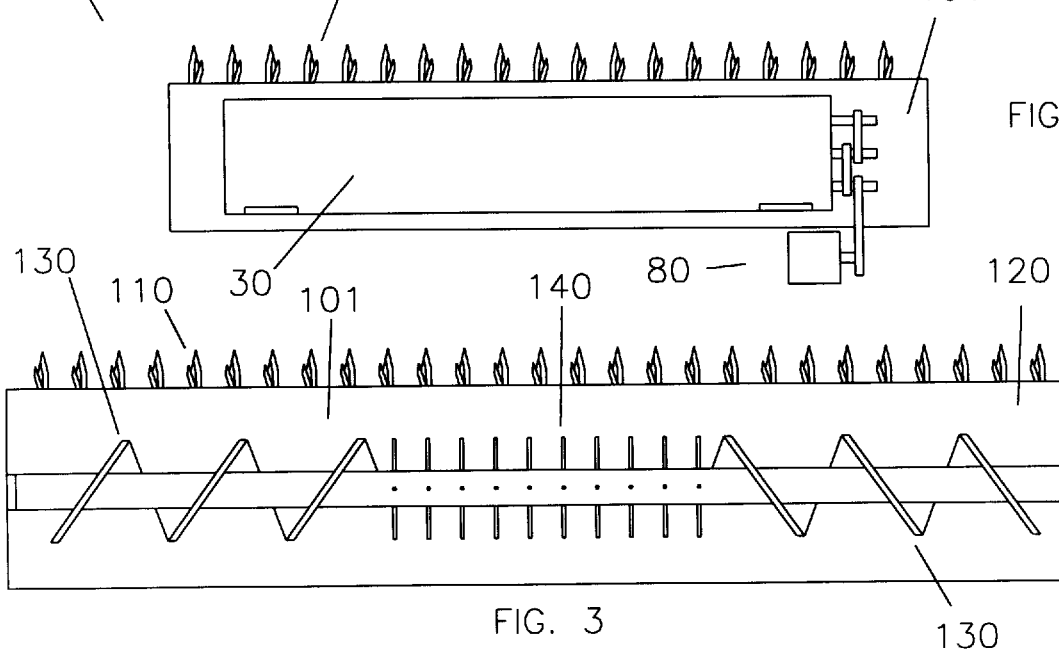
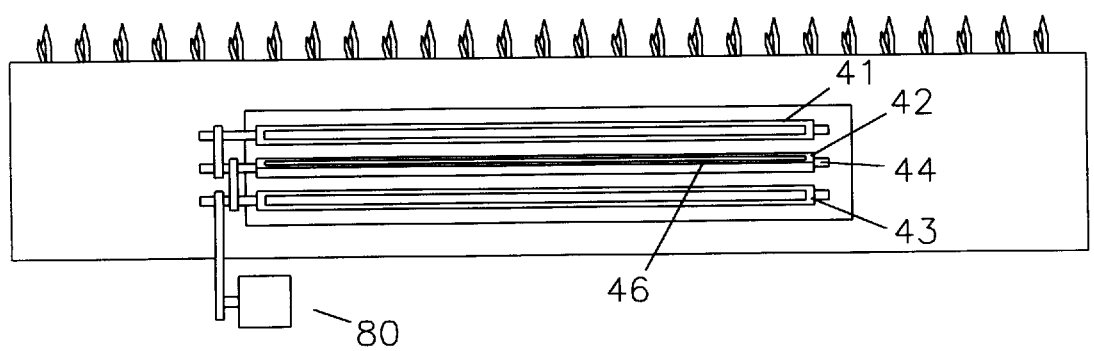

FIG. 8
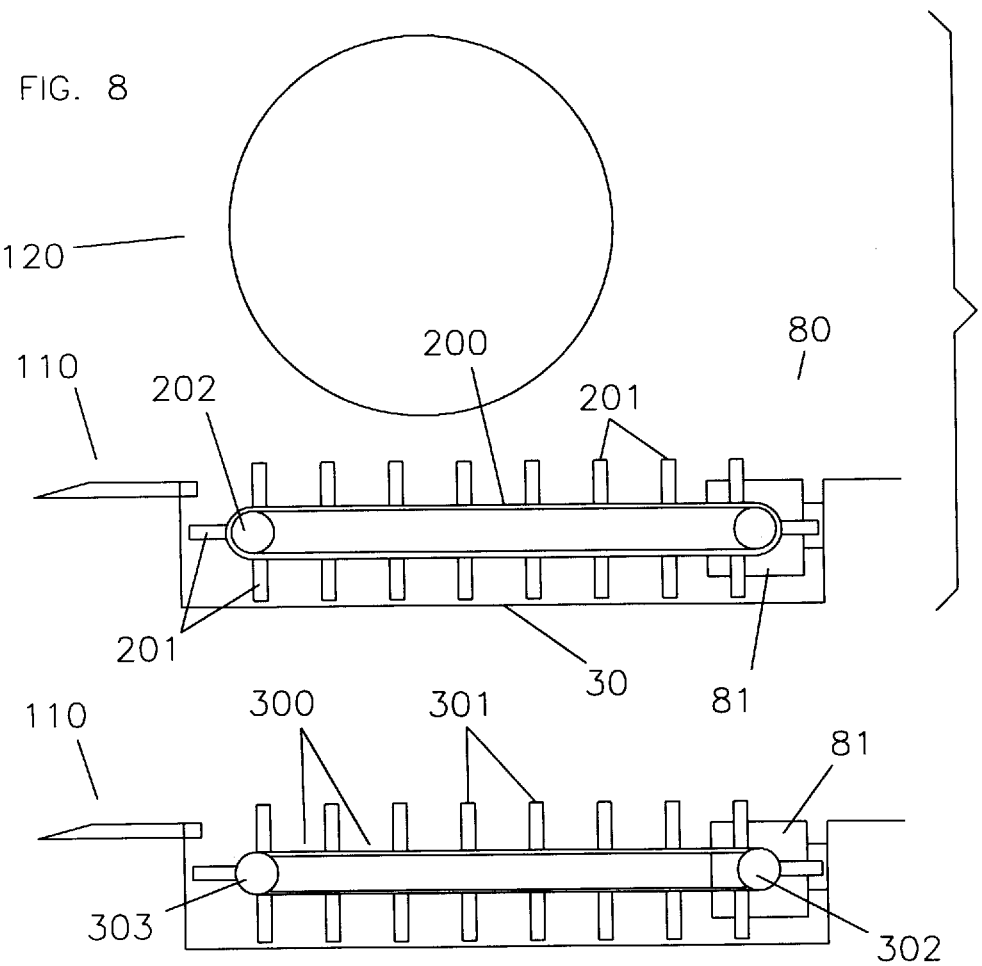
FIG. 9
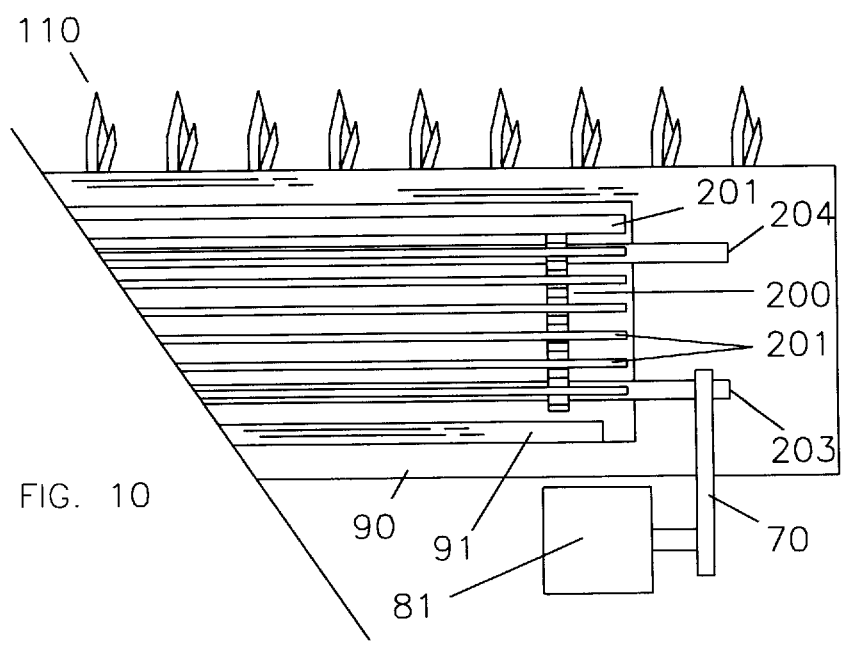
FIG. 10

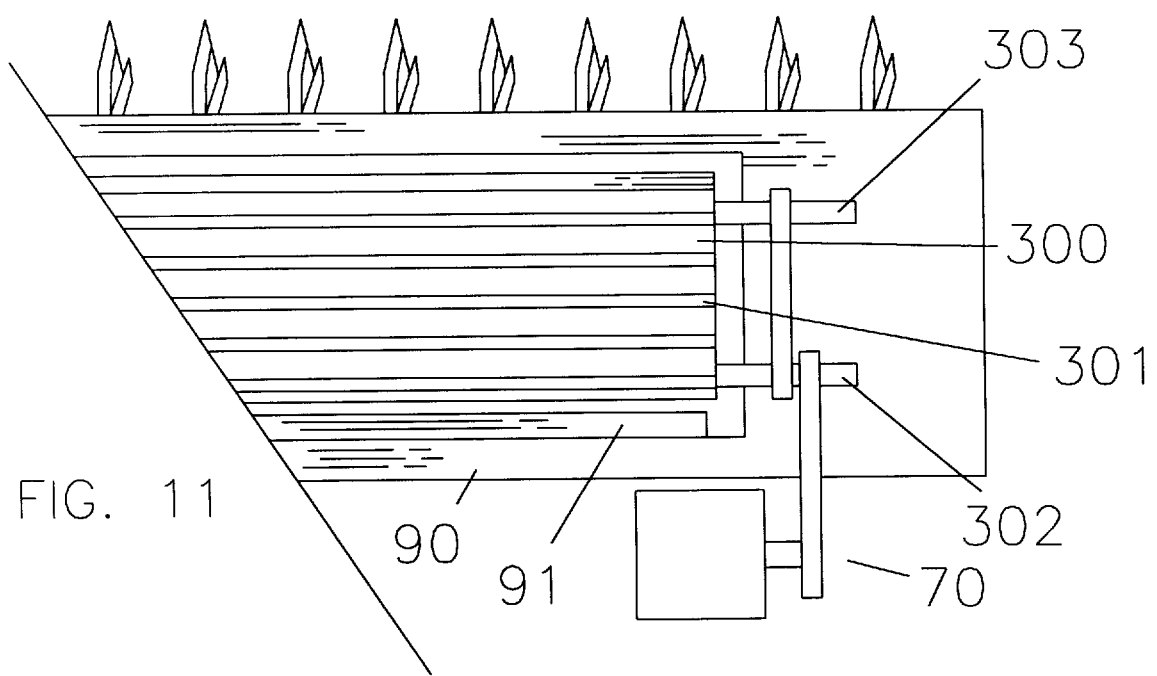

COMBINE HEADER

CROSS-REFERENCES

There are no applications related to this application filed in this or any foreign country.

BACKGROUND

Modern cereal grain harvesting combines have grown substantially in size and productive capacity. However, one area of poor performance common to many combines is in the header design. The header, which cuts and transfers the cut crop material into the feeder area may limit the ground speed of the combine, by jamming if material is fed unevenly or if material is allowed to build up adjacent to the reel.

In most combines, the header provides three key structures. A plurality of shears are front mounted on the header plate and cut grass-type crops a few inches from the soil. Left and right augers transfer the cut crop material into a central region. Rotating spikes then propel the cut material into the combine. The augers and the spikes are carried by a rotating reel, which is typically hydraulically powered.

In many cases the header fails to feed grain into the combine fast enough. This can result in crop buildup and clogging.

A primary cause of this problem is that the rotating spikes must have adequate clearance with the header plate. This means that cut crop material must build up sufficiently before contact is made with the spikes, propelling the material into the combine. Waiting for this buildup is contrary to the goal of eliminating clogging by preventing buildup.

What is needed is an improvement for a combine header that causes cut crop material to feed more quickly and more evenly. The improvement must eliminate the need to wait for cut material to build up to a level sufficient for contact with the rotating spikes. The improvement must cooperate with the auger and spikes used in prior art headers, and must additionally tend to lift cut crop material upwardly, where it will be engaged by the rotating spikes carried by the reel.

SUMMARY

The present invention is directed to an apparatus that satisfies the above needs. A novel improvement for a combine header is provided that causes cut crop material to be fed more quickly and more evenly into the combine.

The improvement to the combine header of the present invention provides:

(a) A plurality of rollers, typically either three or four, mounted in the header plate, behind the front mounted shears, and under the reel carrying an auger and an array of rotating spikes. The rollers are supported on each end by bearings, which allow free rotation. In a first version of the invention, the rollers are formed of square steel tubing, having 2 inch sides and a 60 inch length. The square shape of the rollers tends to throw the crop material upwardly and rearwardly, causing it to be engaged by the spikes rotating on the reel of the header.

(b) A frictional covering is carried by several sides of one or more of the rollers. The frictional covering tends to engage the cut crop material, aiding the rollers to propel it into the spikes rotating on the reel.

In a first version of the invention, the frictional covering provides a covering of felt 51 or other sheet-like material carried directly by the rollers. In a second version of the invention having round rollers, the frictional covering provides a feeder chain 200, supported by the rollers, the feeder chain carrying a plurality of slats 201. The slats are oriented parallel to the rollers. In a third version of the invention, the frictional covering provides an endless canvas loop 300, supported by the rollers, the canvas loop carrying a plurality of slats 301. The slats are oriented parallel to the rollers.

In all versions of the invention, the frictional covering functions to throw cut crop material rearwardly, into the combine.

(c) An hydraulic motor propels a drive system, thereby rotating the rollers. In the preferred embodiment, the drive system comprises a chain drive mechanism. A chain drive links the hydraulic motor and the rear roller. A second chain drive links the rear roller and the middle roller. Similarly, a third chain drive links the middle roller and the front roller. Adjacent rollers are out of phase with each other, as seen by comparison of FIGS. 5 and 6, by approximately 45 degrees.

(d) A stripper bar is carried adjacent to the rear roller, and cleans that roller of debris.

(e) A hinged cover protects the rollers, but opens to allow access to the rollers from below. When the cover is open, the rollers may be cleaned or repaired. The cover is closed when the combine is operated.

It is therefore a primary advantage of the present invention to provide a novel improvement for a combine header that feeds cut crop material into the combine faster and more evenly.

Another advantage of the present invention is to provide a novel improvement for a combine that allows a combine header to operate at a greater speed, and which reduces the tendency to jam when operated at such speeds.

A still further advantage of the present invention is to provide a novel improvement for a combine header that increases the ability of the auger and rotating spikes currently used by most combines to move cut crop material. Much of the increased ability is due to the ability of the plurality of rollers to lift the cut crop material upwardly, thereby moving the crop material into the path of the rotating spikes.

DRAWINGS

These and other features, aspects, and advantages of the present invention will become better understood with regard to the following description, appended claims, and accompanying drawings where:

FIG. 1 is an isometric view from the bottom of a version of the invention having three rollers, a drive system and a motor, carried by a combine header having a plurality of forwardly mounted shears;

FIG. 2 is the isometric view FIG. 1, additionally having a hinged cover in place, covering the rollers;

FIG. 3 is a top isometric view of the combine header of FIG. 1 showing the reel carried by the header having a left and a right auger and radially directed spikes, and showing the shears mounted along the front edge of the header;

FIG. 4 is a top isometric view of the combine header of FIG. 3, having the reel removed, to show the structure of a version of the rollers of the invention carried beneath the reel;

FIG. 8 is a side isometric view of a second version of the invention, having rollers with a circular cross-section supporting a feeder chain supporting slats which drive the cut crop rearwardly;

FIG. 9 is a side isometric view of a third version of the invention, having rollers with a circular cross-section supporting an endless canvas loop supporting slats which drive the cut crop rearwardly;

FIG. 10 is a top isometric view of the combine header of FIG. 8, having the reel removed, to show the structure of the second version of the invention; and FIG. 11 is a top isometric view of the combine header of FIG. 9, having the reel removed, to show the structure of the third version of the invention.

DESCRIPTION

Figure 5:
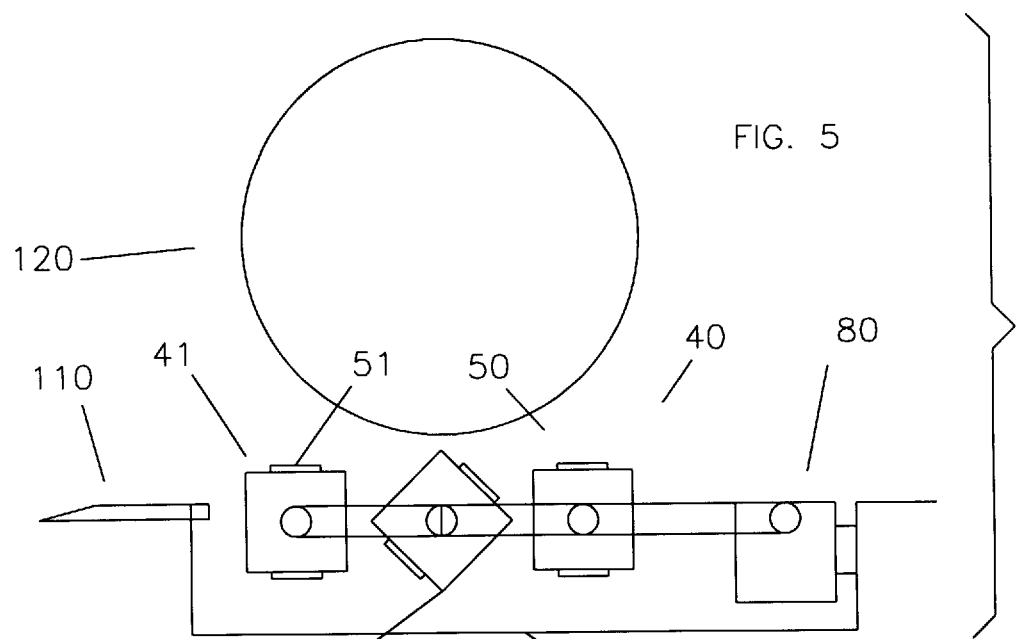
FIG. 5 is a side isometric view of the version of the invention of FIG. 1, showing the three rollers and the hydraulic motor of the invention, in addition to the reel and the sheers of the combine header.

Referring to FIGS. 1 through 7, an improved combine header 100 constructed in accordance with the principles of the invention is seen. The improved combine header provides an hydraulic orbital motor 81 driving a plurality of rollers 40 that are carried by the header underneath the reel 120. The rollers are made of square tubing having a frictional covering 50 that aids in moving cut crop material upwardly into the radially directed spikes 140 and rearwardly into the combine.

Referring in particular to FIG. 3, a top view of the header 100 is seen. A plurality of shears 110 are arrayed along the front edge of the header plate 101. A reel 120 is pivotally carried by the header, and driven in a rotary manner by an hydraulic motor (not shown). The reel 120 carries left and right augers 130, which direct crop material cut by the shears 110 toward the center of the header. An array of radially directed spikes 140 are arrayed in the center portion of the reel. The spikes engage the cut crop material that was moved to the center by the augers 130, and move that crop material rearwardly, into the combine.

Referring in particular to FIG. 4, a top view of the header 100 having the reel 120 removed is seen. A plurality of rollers 40 are rotatably carried by bearing supports 44 or other similar pivotable means. In the preferred embodiment a front roller 41, a middle roller 42 and a rear roller 43 are provided. However, in an alternative species a greater or lesser number of rollers could be provided.

In the preferred embodiment, each roller 40 is formed of steel tubing having a length of 60 inches and a square cross-section having 2 inch sides. The length of the rollers should generally be chosen so as to extend the full width of the array of radially directed spikes 140. This is due to the need to toss cut crop material upwardly under all areas of the array or radially directed spikes.

The cross-sectional side length of 2 inches may also be altered somewhat, while still in keeping with the spirit of the invention. However, since the cross-section of the rollers 40 is square, or nearly square, a greater side length tends to increase the distance between roller centers. A greater side length could therefore allow plant material to drop between rollers. Alternatively, a lesser side length may fail to give the upward lift to the cut crop material, which is required to put the crop material into the path of the rotating spikes. Therefore, it is generally the case that a cross-sectional side length of 2 inches, while not required, is preferred.

Figure 6:
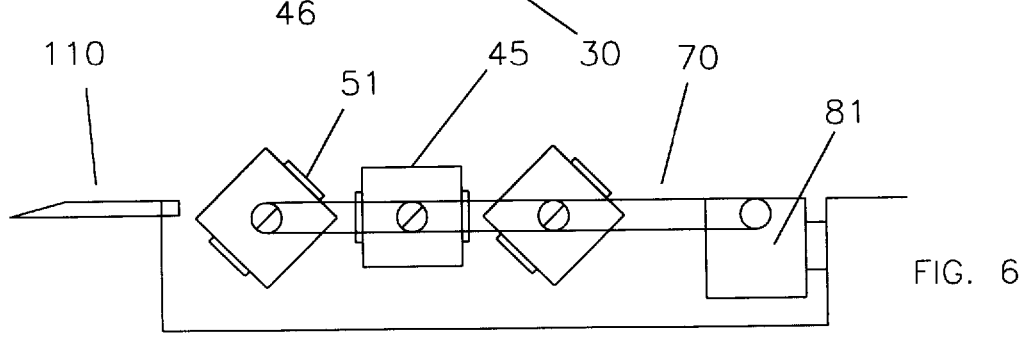
FIG. 6 is a side view similar to FIG. 5, further illustrating how adjacent rollers are 45 degrees out of phase with each other.
Figure 7:
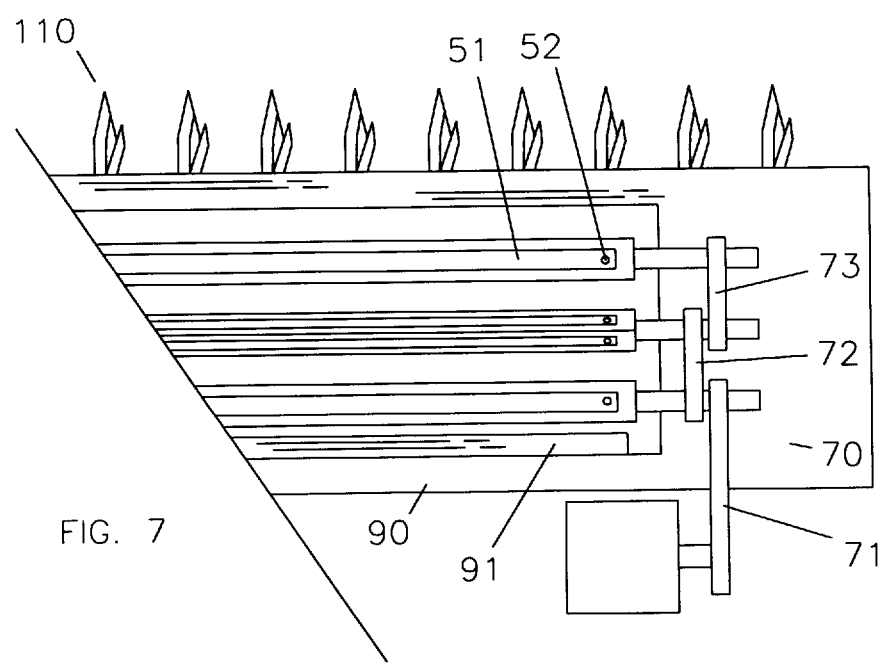
FIG. 7 is an enlarged view from the bottom, similar to that of FIG. 1, better showing the details of the invention, including the frictional covering carried by the rollers.

A frictional covering 50 is carried by the rectangular sidewalls 45 of the rollers 40. In the preferred embodiment, the frictional covering is an elongate strip of felt fabric 51, held in place by fasteners 52. However, other similar coverings could be used to the same advantage. It is not necessary that every sidewall 45 carry the covering 50, although it may be desirable. FIGS. 5 and 6 depict a felt covering 51 on opposite sidewalls 45 of rollers 40. FIG. 7 depicts an alternative embodiment, in which every sidewall 45 is covered by felt 51. The frictional covering functions by improving the grasp by the rollers on the cut crop material, and thereby to better move that material rearwardly into the combine and upwardly into the path of the spikes.

Any of a variety of known motors 80 may be used to rotate the rollers. The power source for this rotation in the preferred embodiment is an hydraulic orbital motor 81 that is plumbed into the hydraulic system that is used to rotate the reel carrying the auger and radially directed spikes. Using the existing hydraulic system provides the most reliable, economical and efficient source of power.

The rollers 40 are all driven in the direction wherein the top portions of the rollers are moving toward the rear of the combine, while the bottom portions of the rollers are moving toward the front of the combine. The rollers are rotated in a "timed" manner; i.e. adjacent rollers are approximately 45 degrees out of phase. This phase difference is illustrated by a comparison of FIGS. 5 and 6, where it is seen that the front roller 41 and the rear roller 43 are rotated in similar attitude, while the middle roller 42 is 45 degrees out of phase with the adjacent rollers 41, 43.

Optionally, the radially directed spikes 140 could be positioned in very close proximity to the rollers. In this event, it may be necessary to coordinate the rotation of the spikes and the rotation of the rollers. Particularly where the middle roller 42 (or other roller) is directly below the reel 120, it may be desirable to have the middle roller to be in the position seen in FIG. 6 when a spike is positioned directly downwardly. Then, when no spike is positioned directly downwardly, the middle roller would be in the position seen in FIG. 5. In this manner, coordination between the revolution of the reel and the revolution of the rollers could prevent contact between the spikes 140 and rollers 40. Typically, this would only require that the revolutions per minute of the rollers be a whole number multiple of the revolutions per minute of the reel.

Continuing to refer to FIGS. 5 and 6, it can be seen that the corners 46 of the rollers 40 are more elevated than the rectangular sidewalls 45 during certain periods of the revolution. For example, in FIG. 5 the corner 46 of middle roller 42 are elevated compared to the rectangular sidewalls 45 or rollers 41, 43. This situation is reversed in FIG. 6, where the rotation of rollers 41, 42, 43 was frozen after a further 45 degrees of rotation. The relationship of the rollers, as described, tends to lift the cut crop material upwardly, where it is caught by radially directed spikes 140.

In the preferred embodiment, the drive system 70 provides a first chain drive 71, which connects the hydraulic motor 81 to the front roller 41. A second chain drive 72 connects the front roller 41 and the middle roller 42. A third chain drive 73 connects the middle roller 42 with the rear roller 43. Alternatively, a single chain drive may be used to connect all rollers 40 with the hydraulic motor 81. In either case, all rollers will rotate at the same angular speed.

Roller cleaning means 90 for cleaning a roller 40 may optionally be provided. The cleaning means 90 typically takes the form of a stripper bar 91, which is an elongate metal sheet adjacent to, and parallel to, the rear roller 43. The stripper bar 91 is typically a length equal to the length of the rollers; in the preferred embodiment this is 60 inches. The stripper bar is carried by the header a spaced distance, typically a fraction of an inch, from the corner 46 of the rear roller 43. Alternatively, stripper bars may be positioned adjacent to other rollers. In operation, crop material or other substance attached to the roller will collide with the stripper bar and be removed from the roller as a result of that collision.

Referring to FIGS. 1 and 2, two views of the underside of the combine header are seen. A cover 30 may be removed to repair or clean the rollers; the cover is used in the closed position during operation and storage. In FIG. 1 the cover 30 is removed, revealing rollers 41, 42 and 43. In FIG. 2 the cover 30 is seen in the closed position.

A modification of the above described version of the improved combine header of the invention replaces the rear roller with a round roller having a 3.5 inch diameter and a length equal to the other rollers, typically 60 inches. The round roller in the rear location may be advantageous in some circumstances. If desired, some of the surface area of the round roller may be covered with a frictional covering, in a manner similar to the square rollers.

Referring to FIGS. 8 and 10, a second version of the improved combine header of the invention replaces the three square 60 inch rollers 40 with at least two parallel 2 inch diameter round rollers 203, 204, typically having a 60 inch length and a circular cross-section. A drive roller 203 is connected to the hydraulic motor 81 by means of a drive system 70. A passive roller 204 is driven by a feeder chain 200, which is driven by the drive roller 203. The space between the rollers is typically 10 to 15 inches, center to center. The round rollers 203, 204 carry sprockets 202 carrying the feeder chain 200. The feeder chain is similar to, but heavier than, a bicycle chain, and supports a plurality of slats 201 which are perpendicular to the feeder chain and parallel to the rollers 203, 204, as seen in particular in FIG. 10.

In operation, the feeder chain 200 is turned in the clockwise direction, as seen in FIG. 8. As a result of the rotation, the slats 201 carried by the feeder chain 200 engage the cut crop material and move it rearwardly, into the combine.

Referring to FIGS. 9 and 11, a third version of the improved combine header of the invention replaces the three square 60 inch rollers 40 of the first version with at least two parallel 2 inch diameter round rollers 302, 303, typically having a 60 inch length. The space between the rollers is typically 10 to 15 inches, center to center. A drive roller 302 is attached to the hydraulic motor 81, typically by a drive system 70. A second roller 303 is typically passive, in that it is not attached to the hydraulic motor. Alternatively, the second roller 303 may be attached to the hydraulic motor, if this is preferred. An endless loop of canvas fabric 300 is carried by the rollers 302, 303. The fabric is typically 60 inches across, and has a diameter of 20 to 30 inches, depending on the size and spacing of the rollers. The canvas is typically of an extremely heavy duty material, and in a preferred embodiment provides a rubberized covering which protects the canvas from moisture and wear, and also better frictionally engages the cut crop material. A plurality of slats 301 are supported by the outside of the canvas fabric 300, as seen in FIGS. 9 and 11.

In operation, the endless loop of canvas fabric is turned in the clockwise direction, as seen in FIG. 9. As a result of the rotation, the slats carried by the canvas 300 engage the cut crop material and move it rearwardly, into the combine.

The previously described versions of the present invention have many advantages, including a primary advantage of providing a novel improvement for a combine header that feeds cut crop material into the combine faster and more evenly.

Another advantage of the present invention is to provide a novel improvement for a combine that allows a combine header to operate at a greater speed, and which reduces the tendency to jam when operated at such speeds.

A still further advantage of the present invention is to provide a novel improvement for a combine header that increases the ability of the auger and rotating spikes currently used by most combines to move cut crop material. Much of the increased ability is due to the ability of the plurality of rollers to lift the cut crop material upwardly, thereby moving the crop material into the path of the rotating spikes.

Although the present invention has been described in considerable detail and with reference to certain preferred versions, other versions are possible. For example, while three rollers are used in the preferred embodiment of the invention, a greater or lesser number could also be used. Also, while in the preferred embodiment a strip of felt is used along one or more rectangular sidewalls of each roller to provide frictional contact with the cut crop material, other materials could be substituted. Moreover, the number of rectangular sidewalls to which the frictional material is applied is may be varied, while in still keeping with the teachings of the invention. Additionally, the roller cleaning means, which in the preferred embodiment comprises a stripper bar, could alternatively comprise brushes or similar cleaning structures. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An improved header for a combine of the type in which shears mounted on a header plate cut crop material, and in which a reel carrying left and right augers and carrying rotating radially directed spikes is used to move the cut crop material into the combine, wherein the improvement comprises:

(A) a plurality of rollers, the rollers rotatable supported by the header rearwardly of the shears;

(B) drive system means, in communication with the rollers, for driving the rollers in a rotating manner;

(C) frictional covering means, carried by the rollers, for releasably engaging the cut crop material and for moving it rearwardly, comprising:
   (a) an endless loop of canvas, carried by the rollers; and
   (b) a plurality of slats, carried by the endless loop of canvas, and (D) motor means, carried by the combine, for propelling the drive system.

2. An improved header for a combine of the type in which shears mounted on a header plate cut crop material, and in which a reel carrying left and right augers and carrying rotating radially directed spikes is used to move the cut crop material into the combine, wherein the improvement comprises:

(A) a plurality of rollers, the rollers rotatably supported by the header rearwardly of the shears;

(B) drive system means, in communication with the rollers, for driving the rollers in a rotating manner;

(C) frictional covering means, carried by the rollers, for releasably engaging the cut crop material and for moving it rearwardly; and (D) motor means, carried by the combine, for propelling the drive system; and (E) a cover, carried by the header, for providing access to the rollers when the combine is not operating.

3. The improved header for a combine of claim 2, wherein the frictional covering means comprises an endless loop of canvas, carried by the rollers.

4. The improved header for a combine of claim 3, wherein the frictional covering means additionally comprises a plurality of slats, carried by the endless loop of canvas.

* * * * *